United States Patent
McElmurry et al.

(10) Patent No.: US 9,720,762 B2
(45) Date of Patent: Aug. 1, 2017

(54) CLEARING BANK DESCRIPTORS FOR REUSE BY A GATE BANK

(71) Applicants: Brian L McElmurry, Roseville, MN (US); Edward Kujawa, Roseville, MN (US); Sandra Wierdsma, Roseville, MN (US)

(72) Inventors: Brian L McElmurry, Roseville, MN (US); Edward Kujawa, Roseville, MN (US); Sandra Wierdsma, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 59 days.

(21) Appl. No.: 14/638,311

(22) Filed: Mar. 4, 2015

(65) Prior Publication Data

US 2016/0259690 A1 Sep. 8, 2016

(51) Int. Cl.
*G06F 11/00* (2006.01)
*G06F 11/07* (2006.01)

(52) U.S. Cl.
CPC ........ *G06F 11/0793* (2013.01); *G06F 11/073* (2013.01)

(58) Field of Classification Search
CPC ............... G06F 11/167; G06F 12/0246; G06F 12/0284; G06F 12/0292; G06F 12/121; G06F 2009/45583
See application file for complete search history.

(56) References Cited

U.S. PATENT DOCUMENTS

| | | | | |
|---|---|---|---|---|
| 4,827,400 A | * | 5/1989 | Dunwell | G06F 12/0292 711/208 |
| 6,161,198 A | * | 12/2000 | Hill | G06F 11/1474 707/999.202 |
| 6,326,973 B1 | * | 12/2001 | Behrbaum | G06F 12/0284 345/520 |
| 2003/0182414 A1 | * | 9/2003 | O'Neill | G06F 8/65 709/223 |
| 2004/0215755 A1 | * | 10/2004 | O'Neill | G06F 8/65 709/223 |
| 2006/0069854 A1 | * | 3/2006 | Jain | G06F 12/121 711/105 |
| 2007/0079279 A1 | * | 4/2007 | Gordon | G06F 8/65 717/100 |
| 2009/0271562 A1 | * | 10/2009 | Sinclair | G06F 12/0246 711/103 |
| 2010/0125554 A1 | * | 5/2010 | Jennings | G06F 9/4418 707/674 |
| 2013/0114340 A1 | * | 5/2013 | Tailliet | G06F 11/20 365/185.11 |
| 2013/0132061 A1 | * | 5/2013 | Rieschl | G06F 9/45554 703/26 |

(Continued)

*Primary Examiner* — Loan L. T. Truong
(74) *Attorney, Agent, or Firm* — Robert P. Marley

(57) ABSTRACT

Systems and methods for clearing bank descriptors for reuse by gate banks without requiring a system reboot are described. In some embodiments, information regarding a bank descriptor of a memory system may be obtained. From the information, a determination may be made as to whether the bank descriptor describes a common bank. When the bank descriptor describes a common bank, the bank descriptor can be updated to no longer describe the common bank.

20 Claims, 4 Drawing Sheets

(56) References Cited

U.S. PATENT DOCUMENTS

2013/0132063 A1\* 5/2013 Rieschl ............... G06F 11/3624
  703/28
2014/0149459 A1\* 5/2014 Rieschl ............. G06F 17/30091
  707/781

\* cited by examiner

CLEARING BANK DESCRIPTORS FOR REUSE BY A GATE BANK

FIELD OF THE DISCLOSURE

The instant disclosure relates to computer memory. More specifically, this disclosure relates to managing memory in computer systems.

BACKGROUND

A memory bank typically consists of contiguous storage containing a set of consecutive program instructions, data, or both. Features of a memory bank are often found in a bank descriptor associated with the memory bank. A bank descriptor is often stored in a bank descriptor table (BDT) that includes many bank descriptors, each containing the description of a different memory bank. Bank descriptors in a BDT are usually referenced with a bank descriptor index (BDI).

Most conventional systems contain at least one common bank, which is a memory bank that is shared with multiple programs so that each of the programs associated with the common bank can access information in the common bank. In conventional systems, when a product that defines a common bank is removed or uninstalled, the associated bank descriptor is typically not cleared. That is, even after a product that defines a common bank is removed or uninstalled, the bank descriptor may still describe the no-longer-available common bank.

When a software subsystem with a specialized memory bank (hereinafter referred to as a gate bank) dedicated to the software subsystem is installed, the gate bank can be designated a BDI. However, because the bank descriptor located at the designated BDI may not be empty, and may instead describe an old common bank, loading of the software subsystem may fail. Loading failure of software subsystems resulting from gate banks being designated. BDIs associated with bank descriptors that are not empty are common in conventional systems.

Traditionally, the aforementioned loading problem has been resolved by performing a system reboot. After the reboot, the bank descriptor no longer describes the common bank, allowing the software subsystem to be successfully loaded. However, performing a system reboot adversely impacts system performance. For example, all applications running in a computer system are stopped by a system reboot and must be restarted after the reboot, and the services of the computer system are not available to users until after the reboot.

SUMMARY

Installation of software subsystems with gate banks dedicated to the software subsystems can be improved by clearing bank descriptors for reuse by the gate banks without requiring a system reboot. According to one embodiment, a method may include obtaining, by a processor, information regarding a bank descriptor of a memory system. The method may also include determining, by the processor from the information, whether the bank descriptor describes a common bank. The method may further include updating, by the processor when the bank descriptor describes a common bank, the bank descriptor to no longer describe the common bank.

According to another embodiment, a computer program product may include a non-transitory computer-readable medium comprising code to perform the step of obtaining information regarding a bank descriptor of a memory system. The medium may also be configured to perform the step of determining, from the information, whether the bank descriptor describes a common bank. The medium may be further configured to perform the step of updating, when the bank descriptor describes a common bank, the bank descriptor to no longer describe the common bank.

According to yet another embodiment, an apparatus may include a memory and a processor coupled to the memory. The processor may be configured to execute the step of obtaining information regarding a bank descriptor of a memory system. The processor may also be configured to execute the step of determining, from the information, whether the bank descriptor describes a common bank. The processor may be further configured to execute the step of updating, when the bank descriptor describes a common bank, the bank descriptor to no longer describe the common bank.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
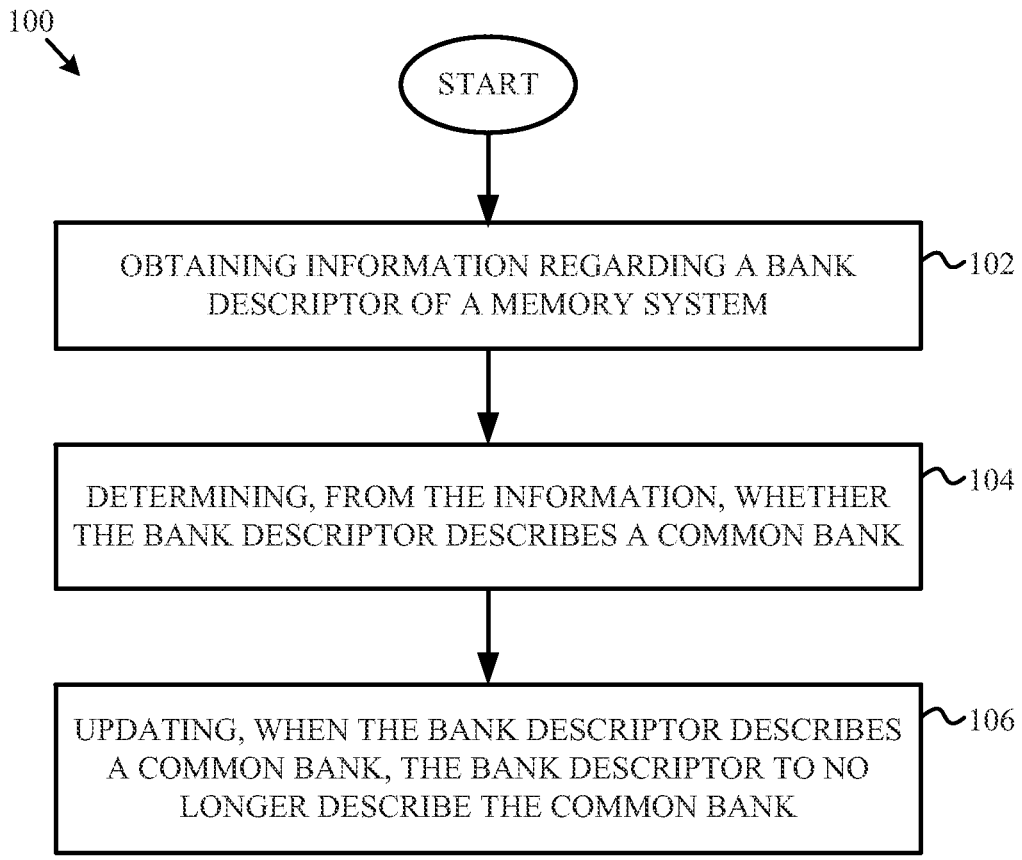
FIG. 1 is a flow chart illustrating a method for clearing bank descriptors for reuse by gate banks without requiring a system reboot according to one embodiment of the disclosure.

FIG. 1 is a flow chart illustrating a method for clearing bank descriptors for reuse by gate banks without requiring a system reboot according to one embodiment of the disclosure. Embodiments of method 100 may be implemented with the systems described with respect to FIGS. 2-4. Specifically, method 100 includes, at block 102, obtaining information regarding a bank descriptor of a memory system. In some embodiments, the information regarding the bank descriptor may be obtained via a specific function call, such as INSPECT$BANK.

In some embodiments, prior to obtaining the information regarding the bank descriptor of the memory system, a software product that accesses the common bank may be uninstalled and a software product with a gate bank can be installed. In another embodiment, the information regarding the bank descriptor of the memory system may be obtained before the software product with a gate bank has been installed. According to an embodiment, the software products may include message control bank (MCB) software products.

At block 104, method 100 includes determining, from the information, whether the bank descriptor describes a common bank. Method 100 also includes, at block 106, updating, when the bank descriptor describes a common bank, the bank descriptor to no longer describe the common bank In some embodiments, updating the bank descriptor may include reloading the bank descriptor. For example, reloading of the bank descriptor may be initiated via a specific function call, such as ER BANK$. According to another embodiment, updating the bank descriptor may further include handling an error generated by the memory system after the step of reloading. The reload may fail in the case that the product that defined the common bank is no longer installed, and so the method may execute error handling to handle the failure of the reload. Even though the reload fails, the attempt at reloading causes the BD to be updated and may cause the determination that the BD no longer describes a common bank and the BD can then be reused. The utility goes on to inspect the relevant BD to confirm the intended result and to report the result.

In some embodiments, after updating the bank descriptor to no longer describe the common bank, information regarding the bank descriptor may be obtained again and a determination may be made as to whether the bank descriptor no longer describes the common bank. In another embodiment, after updating the bank descriptor, a software product that accesses a gate bank may be executed. In some embodiments, the software product with the gate bank may cause the bank descriptor to describe the gate bank after the bank descriptor has been updated.

The method described in FIG. 1 may be executed by a computer program on a computer system as a utility automatically after software installation, such as installation of an updated master control bank (MCB) software. After the utility has been run successfully, the first access to MCB by a calling program may causes the subsystem gate bank to be loaded into memory and allow reuse of the BD. In another embodiment, if an old MCB software version is uninstalled separately from installation of the new product, such as before, rather than co-incident with the new installation, then this utility may be run either before or after the installation of the new MCB software product, as long as it is after uninstalling the old product.

Figure 2:
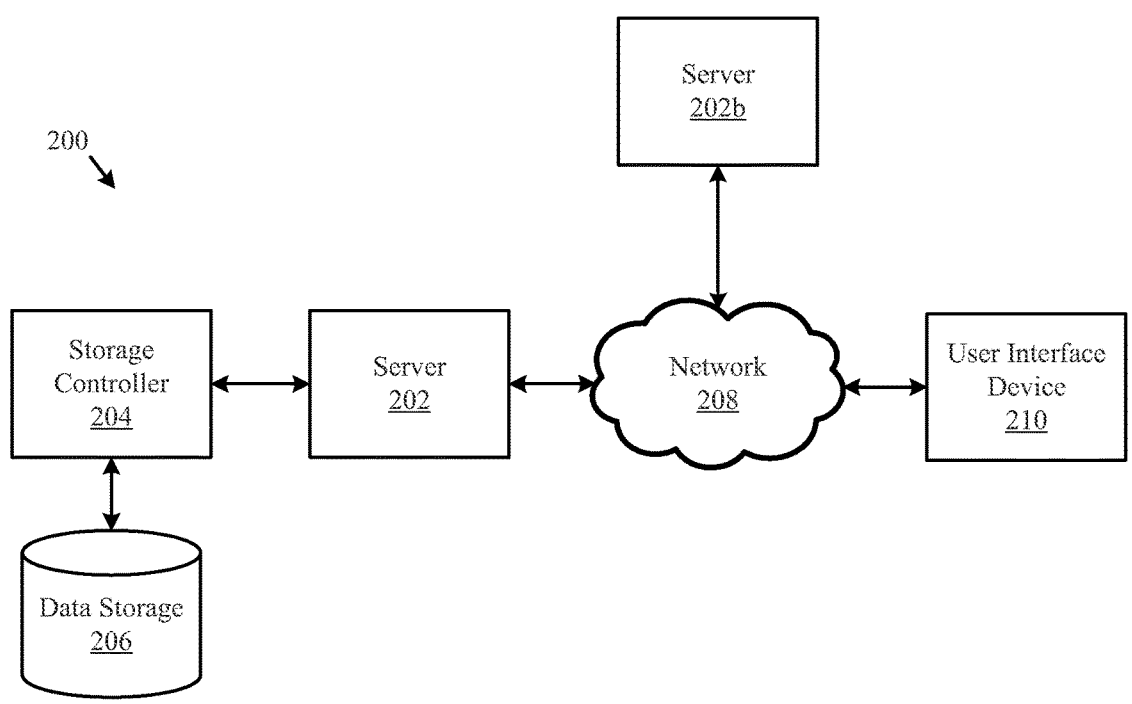
FIG. 2 is a block diagram illustrating a computer network according to one embodiment of the disclosure.

FIG. 2 illustrates one embodiment of a system 200 for clearing bank descriptors for reuse by gate banks. The system 200 may include a server 202, a data storage device 206, a network 208, and a user interface device 210. The server 202 may also be a hypervisor-based system executing one or more guest partitions hosting operating systems with modules having server configuration information. In a further embodiment, the system 200 may include a storage controller 204, or a storage server configured to manage data communications between the data storage device 206 and the server 202 or other components in communication with the network 208. In an alternative embodiment, the storage controller 204 may be coupled to the network 208.

In one embodiment, the user interface device 210 is referred to broadly and is intended to encompass a suitable processor-based device such as a desktop computer, a laptop computer, a personal digital assistant (PDA) or tablet computer, a smartphone or other mobile communication device having access to the network 208. In a further embodiment, the user interface device 210 may access the Internet or other wide area or local area network to access a web application or web service hosted by the server 202 and may provide a user interface for enabling a user to enter or receive information.

The network 208 may facilitate communications of data between the server 202 and the user interface device 210. In some embodiments, the network 208 may also facilitate communication of data between the server 202 and other servers/processors, such as server 202b. For example, the network 208 may include a switched fabric computer network communications link to facilitate communication between servers/processors, also referred to as data storage nodes. In some embodiments, the servers 202 and 202b may represent nodes or clusters of nodes managed by a software framework. The network 208 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 3:
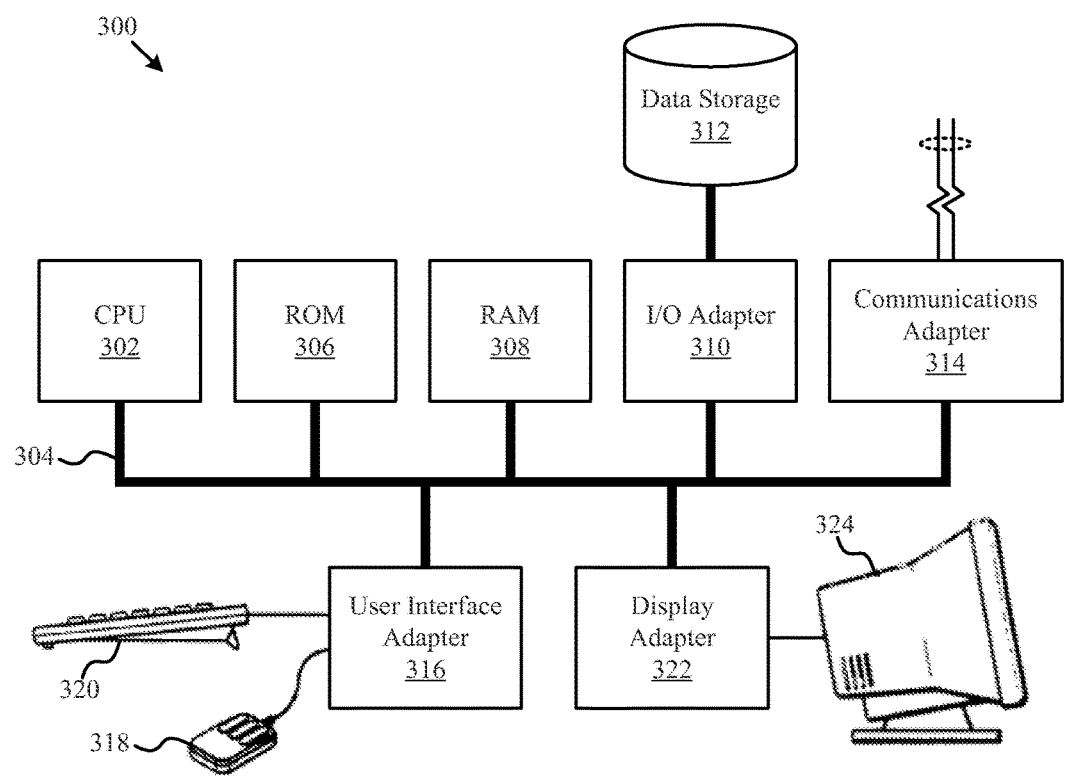
FIG. 3 is a block diagram illustrating a computer system according to one embodiment of the disclosure.

FIG. 3 illustrates a computer system 300 adapted according to certain embodiments of the server 202 and/or the user interface device 210. The central processing unit ("CPU") 302 is coupled to the system bus 304. The CPU 302 may be a general purpose CPU or microprocessor, graphics processing unit ("GPU"), and/or microcontroller. The present embodiments are not restricted by the architecture of the CPU 302 so long as the CPU 302, whether directly or indirectly, supports the operations as described herein. The CPU 302 may execute the various logical instructions according to the present embodiments.

The computer system 300 may also include random access memory (RAM) 308, which may be synchronous RAM (SRAM), dynamic RAM (DRAM), synchronous dynamic RAM (SDRAM), or the like. The computer system 300 may utilize RAM 308 to store the various data structures used by a software application. The computer system 300 may also include read only memory (ROM) 306 which may be PROM, EPROM, EEPROM, optical storage, or the like. The ROM may store configuration information for booting the computer system 300. The RAM 308 and the ROM 306 hold user and system data, and both the RAM 308 and the ROM 306 may be randomly accessed.

The computer system 300 may also include an input/output (I/O) adapter 310, a communications adapter 314, a user interface adapter 316, and a display adapter 322. The I/O adapter 310 and/or the user interface adapter 316 may, in certain embodiments, enable a user to interact with the computer system 300. In a further embodiment, the display adapter 322 may display a graphical user interface (GUI)

associated with a software or web-based application on a display device 324, such as a monitor or touch screen.

The I/O adapter 310 may couple one or more storage devices 312, such as one or more of a hard drive, a solid state storage device, a flash drive, a compact disc (CD) drive, a floppy disk drive, and a tape drive, to the computer system 300. According to one embodiment, the data storage 312 may be a separate server coupled to the computer system 300 through a network connection to the I/O adapter 310. The communications adapter 314 may be adapted to couple the computer system 300 to the network 208, which may be one or more of a LAN, WAN, and/or the Internet. The user interface adapter 316 couples user input devices, such as a keyboard 320, a pointing device 318, and/or a touch screen (not shown) to the computer system 300. The display adapter 322 may be driven by the CPU 302 to control the display on the display device 324. Any of the devices 302-322 may be physical and/or logical.

The applications of the present disclosure are not limited to the architecture of computer system 300. Rather the computer system 300 is provided as an example of one type of computing, device that may be adapted to perform the functions of the server 202 and/or the user interface device 310. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 300 may be virtualized for access by multiple users and/or applications.

Figure 4A:
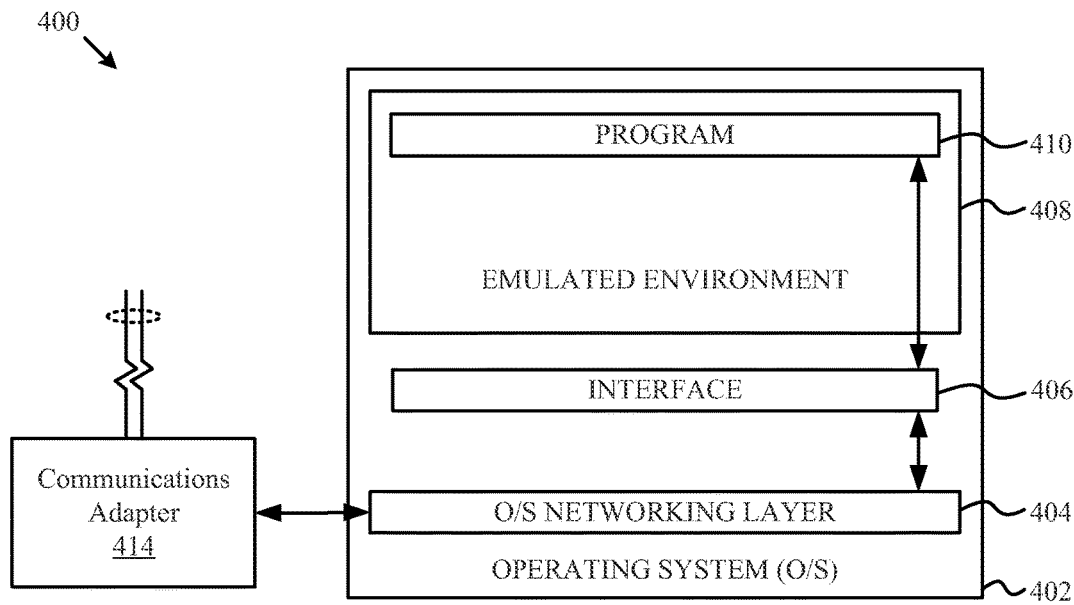
FIG. 4A is a block diagram illustrating a server hosting an emulated software environment for virtualization according to one embodiment of the disclosure.

FIG. 4A is a block diagram illustrating a server hosting an emulated software environment for virtualization according to one embodiment of the disclosure. An operating system 402 executing on a server includes drivers for accessing hardware components, such as a networking layer 404 for accessing the communications adapter 414. The operating system 402 may be, for example, Linux or Windows. An emulated environment 408 in the operating system 402 executes a program 410, such as Communications Platform (CPComm) or Communications Platform for Open Systems (CPCommOS). The program 410 accesses the networking layer 404 of the operating system 402 through a non-emulated interface 406, such as extended network input output processor (XNIOP). The non-emulated interface 406 translates requests from the program 410 executing in the emulated environment 408 for the networking layer 404 of the operating system 402.

Figure 4B:
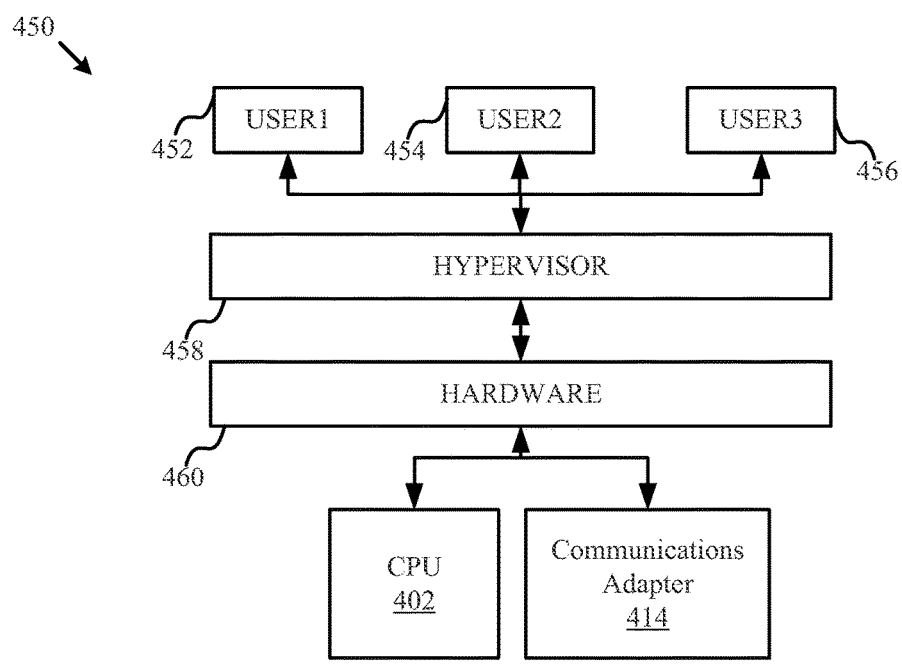
FIG. 4B is a block diagram illustrating a server hosting an emulated hardware environment according to one embodiment of the disclosure.

In another example, hardware in a computer system may be virtualized through a hypervisor. FIG. 4B is a block diagram illustrating a server hosting an emulated hardware environment according to one embodiment of the disclosure. Users 452, 454, 456 may access the hardware 460 through a hypervisor 458. The hypervisor 458 may be integrated with the hardware 460 to provide virtualization of the hardware 460 without an operating system, such as in the configuration illustrated in FIG. 4A. The hypervisor 458 may provide access to the hardware 460, including the CPU 402 and the communications adaptor 414.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media. Additionally, the firmware and/or software may be executed by processors integrated with components described above.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   obtaining, by a processor, information regarding a bank descriptor of a memory system;
   determining, by the processor from the information, whether the bank descriptor describes a common bank, the common bank being previously uninstalled; and
   updating, by the processor when the bank descriptor describes the common bank, the bank descriptor without rebooting to no longer describe the common bank.

2. The method of claim 1, wherein the step of updating the bank descriptor comprises reloading, by the processor, the bank descriptor.

3. The method of claim 2, wherein the step of updating the bank descriptor further comprises handling an error generated by the memory system after the step of reloading.

4. The method of claim 1, further comprising:
   again obtaining, by the processor, information regarding the bank descriptor; and
   determining, by the processor, that the bank descriptor no longer describes the common bank.

5. The method of claim 1, further comprising uninstalling a software product that accesses the common bank before the step of obtaining.

6. The method of claim 5, further comprising executing a software product that accesses a gate bank after the step of updating the bank descriptor, wherein the software product causes the bank descriptor to describe the gate bank.

7. The method of claim 5, wherein the software product comprises a message control bank (MCB) software product.

8. A computer program product, comprising:
a non-transitory computer readable medium comprising instructions that, when executed by a processor of a computing system, cause the processor to perform the steps of:
obtaining information regarding a bank descriptor of a memory system;
determining, from the information, whether the bank descriptor describes a common bank, the common bank being previously uninstalled; and
updating, when the bank descriptor describes the common bank, the bank descriptor without rebooting to no longer describe the common bank.

9. The computer program product of claim 8, wherein the step of updating the bank descriptor comprises reloading the bank descriptor.

10. The computer program product of claim 9, wherein the step of updating the bank descriptor further comprises handling an error generated by the memory system after the step of reloading.

11. The computer program product of claim 8, wherein the medium further comprises instructions to cause the processor to perform the steps of:
again obtaining information regarding the bank descriptor; and
determining, by the processor, that the bank descriptor no longer describes the common bank.

12. The computer program product of claim 8, wherein the medium further comprises instructions to cause the processor to perform the step of uninstalling a software product that accesses the common bank before the step of obtaining.

13. The computer program product of claim 12, wherein the medium further comprises instructions to cause the processor to perform the step of executing a software product that accesses a gate bank after the step of updating the bank descriptor, wherein the software product causes the bank descriptor to describe the gate bank.

14. The computer program product of claim 12, wherein the software product comprises a message control bank (MCB) software product.

15. An apparatus, comprising:
a memory;
a processor coupled to the memory, wherein the processor is further configured to perform the steps of:
obtaining information regarding a bank descriptor of a memory system;
determining, from the information, whether the bank descriptor describes a common bank, the common bank being previously uninstalled; and
updating, when the bank descriptor describes the common bank, the bank descriptor without rebooting to no longer describe the common bank.

16. The apparatus of claim 15, wherein the step of updating the bank descriptor comprises reloading the bank descriptor.

17. The apparatus of claim 16, wherein the step of updating the bank descriptor further comprises handling an error generated by the memory system after the step of reloading.

18. The apparatus of claim 15, wherein the processor is further configured to perform the steps of:
again obtaining information regarding the bank descriptor; and
determining, by the processor, that the bank descriptor no longer describes the common bank.

19. The apparatus of claim 15, wherein the processor is further configured to perform the step of uninstalling a software product that accesses the common bank before the step of obtaining.

20. The apparatus of claim 19, wherein the processor is further configured to perform the step of executing a software product that accesses a gate bank after the step of updating the bank descriptor, wherein the software product causes the bank descriptor to describe the gate bank.

* * * * *